Figures 1, 2:
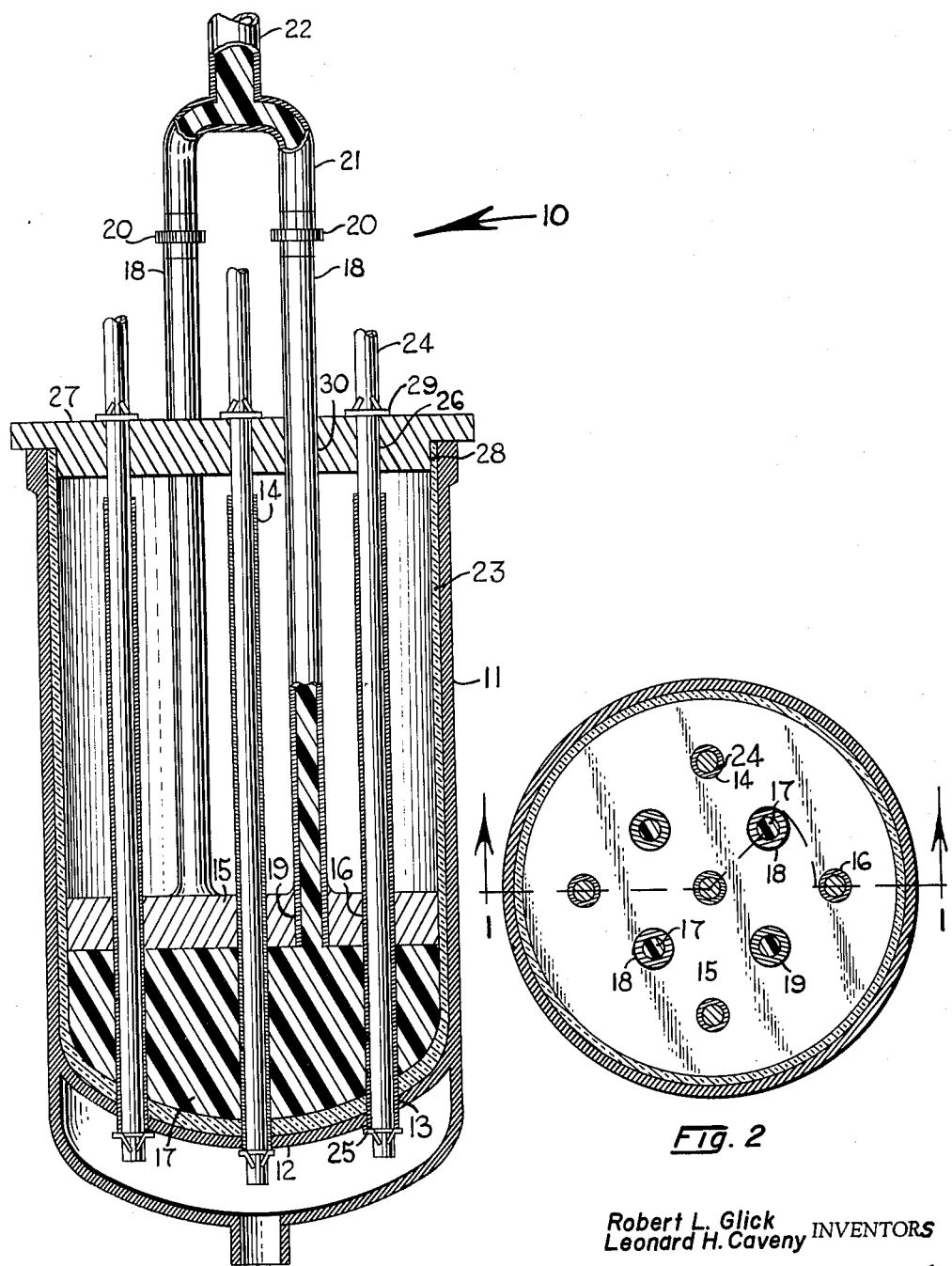

Robert L. Glick
Leonard H. Caveny INVENTORS

BY

ATTORNEY

United States Patent Office 3,261,255
Patented July 19, 1966

3,261,255
CASTING APPARATUS FOR SOLID PROPELLANT ROCKET MOTORS
Robert L. Glick and Leonard H. Caveny, Huntsville, Ala., assignors to Thiokol Chemical Corporation, Bristol, Pa., a corporation of Delaware
Filed Nov. 16, 1964, Ser. No. 411,448
1 Claim. (Cl. 86—20)

This invention relates to improvements in casting apparatus for solid propellant rocket motors and, more particularly, to an apparatus for casting a rocket motor such as shown and described in copending application Serial Number 403,554.

Solid propellant rocket motors are usually fabricated by positioning a mandrel in a rocket motor case and then casting into the rocket motor case by various methods a solid propellant in its uncured state. After the solid propellant has reached the proper consistency, the mandrel is withdrawn leaving a central core configuration in the solid propellant.

Since the rocket motor previously referred to could not be cast in the conventional manner, the apparatus embodying the instant invention was designed. Whereas tubes were to be positioned in the rocket motor case prior to the casting of the solid propellant therein, the apparatus had to include means for supporting these tubes and also means had to be provided for casting the solid propellant in the rocket motor around the tubes while, at the same time, preventing the exposure of the solid propellant to the atmosphere during the casting thereof.

Since a mandrel was not to be used, no other provision therefor had to be considered; and since the tubes remained embedded in the solid propellant, no consideration had to be given to forming a central configuration in the solid propellant.

It is an object of this invention, therefore, to provide an apparatus that would cast solid propellant into a rocket motor case while supporting therein a plurality of tubular members.

It is another object of the invention to provide an apparatus that would eliminate the contact of the surrounding atmosphere with the solid propellant during the casting thereof in the rocket motor case.

Many different types of apparatus had been unsuccessfully tried before the instant invention was finalized, since the instant apparatus is a far departure from conventional apparatus that have been used to cast conventional solid propellant rocket motors.

With the above and other objects and advantages in view, the invention consists of the novel details of construction, arrangement and combination of parts more fully hereinafter described, claimed and illustrated in the accompanying drawing in which:

FIGURE 1 is an enlarged longitudinal sectional view, partly broken away, of the apparatus embodying the invention taken approximately on the line 1—1 of FIGURE 2 and illustrating the manner of use thereof while casting a solid propellant rocket motor, and FIGURE 2 is a transverse, sectional view of FIGURE 1 taken along the upper surface of the tube positioning plate of the apparatus.

Referring more in detail to the drawing wherein like parts are designated by like reference numerals, the reference numeral 10 is used to generally designate the apparatus embodying the invention.

The rocket motor case 11 that is to have a solid propellant mix cast therein by the use of the apparatus 10 has a concavo-convex header 12 integral therewith which is provided with a plurality of relatively-spaced openings 13 into each of which is inserted a tube 14.

The apparatus 10, therefore, to compensate for the presence of the tubes 14 in the rocket motor case 11 comprises a circular tube positioning plate 15 which is provided with a plurality of openings 16 through which the tubes 14 extend.

To cast a solid propellant mixture 17 into the motor case 11, it is necessary to provide a plurality of supply lines or bayonets 18 through which the solid propellant mixture 17 is fed to the solid rocket motor 11 from a casting can, not shown. The bayonets 18 extend through openings 19 in the positioning plate 15 so that the solid propellant 17 is cast into the rocket motor case below the positioning plate 15. The bayonets 18 extend outwardly of the motor case 11 to be connected by couplings 20 to a spider coupling 21 on the free end of the supply line 22 from the casting can. The diameter of the positioning plate 15 is such that there is extremely close tolerance between the peripheral edge thereof and the insulation 23 in the motor case 11 so that the positioning plate 15 can be easily inserted and withdrawn from the motor case 11 as the solid propellant mixture 17 is cast therein, but the tolerance is such that very little air will pass into that area of the rocket motor case 11 into which the solid propellant mixture 17 is being cast.

In order to properly support the tubes 14 and give them geometrical stability, steel supporting wires 24 are threaded into the tubes 14 before they are placed in the rocket motor case 11, and quick detachable clips 25 are placed on the wires 24 at the lower ends of the tubes 14 to prevent the wires 24 from becoming disengaged from the tubes 14 until sufficient force is exerted on the wires 24 to disengage the clips 25 therefrom.

The wires 24 extend longitudinally of the motor case 11 to extend outwardly thereof through openings 26 in a header plate 27.

The header plate 27 is of circular formation and has a reduced portion 28 that fits with close tolerance within the aft end of the motor case 11. The header plate 27 is of a size that will enable it to rest on the edge of the motor case 11 and be supported thereby. Sufficient tension is placed on the wires 24 so that they will properly support the tubes 14 and then quick detachable clips 29 are placed on the wires 24 to maintain such tension. No special tensioning device is used to place tension on the wires 24, and such tension may be manually applied by the operator that is supervising the casting of the solid propellant mixture 17 into the rocket motor case 11.

There are two methods for using the apparatus 10. The first step, however, in both instances is to insert the lower ends of the tubes 14 with the wires 24 in the tubes and the clips 25 in place into the openings 13 in the header 12. The insulation 23 is then applied to the interior surface of the motor case 11 and the motor case is then ready to have the solid propellant 17 cast therein.

The first method that can be used where the apparatus 10 is concerned is to lower the positioning plate 15 into the rocket motor case 11 after the tubes 14 and wires 24 have been inserted through the openings 16 in the positioning plate 15. The bayonets 18 being used for handling the positioning plate 15 with a suitable hoist being grappled thereto. After the positioning plate 15 has been lowered to its lowermost limit in the rocket motor case, the couplings 20 may be disconnected and the header plate 27 hoisted into position. The wires 24 being inserted through the openings 26 therein and the bayonets 18 being inserted through the openings 30 therein before the header plate 27 finally comes to rest on the edge of the rocket motor case 11. The wires 24 are then tensioned and the clips 29 put in place. The spider 21 is then returned to position to be connected to the bayonets 18 by the couplings 20.

The second method is to disconnect the couplings 20, place the header plate 27 on top of the positioning plate 15, reconnect the couplings 20 and then hoist this assembly until the positioning plate 15 can be lowered into the rocket motor case 11. The wires 24 can then be inserted through the openings 16 in the positioning plate 15 and the openings 26 in the header plate 27. When the positioning plate 15 approaches the tubes 14, they may be guided by the wires 24 into the openings 16; and as the positioning plate 15 is lowered into the rocket motor case 11, the header plate 27 will engage and be supported on the edge of the rocket motor case 11. The wires 24 can then be tensioned and the clips 29 placed in position after the positioning plate 15 has reached its lowermost position.

As the solid propellant 17 is cast into the rocket motor case 11, it will cause the positioning plate 15 to rise on the upper surface thereof, and the casting of the solid propellant is continued until the positioning plate 15 comes into contact with the header plate 27. Any air trapped within the motor case 11 between the positioning plate 15 and the header plate 27 will escape through the openings 26 in the header plate 27. At this time, the couplings 20 may be disconnected and the rocket motor case 11, with the apparatus therein, may be moved to the curing oven. Secondly, the clips 29 may be removed and the positioning plate 15 and header plate 27 may be removed from the rocket motor case 11 and the rocket motor case 11 may then be moved to the curing oven.

After the solid propellant mixture 17 has been cured after the first operation, as described, has been completed, the rocket motor case 11 may be removed from the curing oven and the positioning plate 15 and the header plate 27 may be removed as in the second operation described.

In each instance, however, the wires 24 remain in the tubes 14 until a nozzle, not shown, is to be connected to the motor case 11. At this time, sufficient force is applied to the wires 24 to make the clips 25 ineffective, and the wires are removed from the tubes 14.

The wires 24, while in place, will prevent the tubes 14 from becoming clogged or damaged.

All components are made of a non-corrosive durable material, and after proper cleaning may be used repeatedly to cast many rocket motors. The size of the apparatus will depend on the size of the rocket motor case being used; therefore, size is no limitation for the apparatus.

It is believed that, from the foregoing description, the mode of operation of the apparatus and the construction thereof will be apparent to those skilled in the art and it is to be further understood that variations in the mode of operation and the structure of the apparatus may be adhered to provided such variations fall within the spirit of the invention and the scope of the appended claim.

Having thus described the invention, what is claimed as new and desired to be secured by Letters Patent is:

An apparatus for casting a solid propellant mix into a rocket motor case having longitudinally-extending tubes therein comprising a positioning plate having relatively-spaced openings therein to receive the tubes, supply lines connected to said positioning plate to cast the solid propellant mix in the motor case, a concavo-convex header plate integral with said rocket motor case adjacent the head end thereof, said concavo-convex header plate having relatively-spaced openings therein to receive the inner ends of said tubes, a circular header plate having an integral reduced portion thereon that is positioned in the aft end of said rocket motor case, said circular header plate having relatively-spaced openings therein to receive said supply lines, tensioning wires extending through said tubes and said header plates for maintaining the geometrical stability of said tubes, and quick detachable clips connected to the opposite ends of said tensioning wires for maintaining the tension thereof.

References Cited by the Examiner

UNITED STATES PATENTS

| | | | |
|---|---|---|---|
| 3,021,748 | 2/1962 | Miller | 86—1 |
| 3,141,193 | 7/1964 | Slemmons | 18—5 |
| 3,144,829 | 8/1964 | Fox | 86—1 X |
| 3,186,035 | 6/1965 | Grace | 264—3 X |

BENJAMIN A. BORCHELT, *Primary Examiner.*

R. V. LOTTMANN, P. A. SHANLEY,
*Assistant Examiners*